US010315267B2

(12) United States Patent
Naber et al.

(10) Patent No.: US 10,315,267 B2
(45) Date of Patent: Jun. 11, 2019

(54) TIG WELDING SYSTEM

(71) Applicant: Lincoln Global, Inc., City of Industry, CA (US)

(72) Inventors: Ferdinand M. Naber, Wijchen (NL); Theresa M. Spear, Highland Heights, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 321 days.

(21) Appl. No.: 14/263,265

(22) Filed: Apr. 28, 2014

(65) Prior Publication Data

US 2015/0306691 A1    Oct. 29, 2015

(51) Int. Cl.
*B23K 9/073*    (2006.01)
*B23K 9/167*    (2006.01)
(Continued)

(52) U.S. Cl.
CPC ........... *B23K 9/0732* (2013.01); *B23K 9/067* (2013.01); *B23K 9/0673* (2013.01);
(Continued)

(58) Field of Classification Search
CPC .... B23K 9/067; B23K 9/0673; B23K 9/0732; B23K 9/0956; B23K 9/167; B23K 9/24
USPC .............. 219/130.4, 121.11, 121.13, 121.33, 219/121.45, 122, 124.1, 131.1, 131.32, 219/130.5, 136, 137 WM, 121 P, 121 R, 219/74, 75, 76, 145, 137.7, 137.71, 137.9, 219/483, 130.01, 130.51, 130.31, 130.32, 219/130.33, 137 PS, 130.1, 137 R, 125.1, 219/130.21, 137.3, 121.14, 121.17, 121.2, 219/121.35, 121.38, 121.41, 121.44, 219/121.46, 121.59, 124.21, 124.22, 219/124.31, 124.32, 124.33, 124.34, 219/124.4, 124.5, 137.2; 428/595; 483/7, 8, 9, 10, 11, 16, 901
See application file for complete search history.

(56) References Cited

U.S. PATENT DOCUMENTS 3,071,680 A * 1/1963 Anderson .............. B23K 9/091
                                                    219/130.51
3,413,436 A * 11/1968 Tallman ................. B23K 9/167
                                                    219/75
(Continued)

FOREIGN PATENT DOCUMENTS

CA    2878065 A1    3/2014
GB    1015693 A     1/1966
(Continued)

OTHER PUBLICATIONS

International Search Report with Written Opinion for PCT/IB2012/000583 dated Oct. 27, 2015.
(Continued)

*Primary Examiner* — Dana Ross
*Assistant Examiner* — Ket D Dang
(74) *Attorney, Agent, or Firm* — David J. Muzilla

(57) ABSTRACT

A TIG welding system is provided including a power source having a controller in communication therewith, the controller having a memory storing at least one waveform and associated with a welding electrode composition (color) in combination with a welding electrode diameter (detected or input).

12 Claims, 6 Drawing Sheets

(51) Int. Cl.
*B23K 9/095* (2006.01)
*B23K 9/067* (2006.01)
*B23K 9/24* (2006.01)

(52) U.S. Cl.
CPC ............ *B23K 9/0956* (2013.01); *B23K 9/167* (2013.01); *B23K 9/24* (2013.01)

(56) References Cited

U.S. PATENT DOCUMENTS

| | | | |
|---|---|---|---|
| 3,521,027 A * | 7/1970 | Partington | B23K 9/092 |
| | | | 219/130.51 |
| 4,427,874 A * | 1/1984 | Tabata | B23K 9/091 |
| | | | 219/130.31 |
| 4,560,857 A | 12/1985 | Segawa et al. | |
| 6,075,224 A | 6/2000 | De Coster | |
| 6,103,994 A * | 8/2000 | DeCoster | B23K 9/0953 |
| | | | 219/130.5 |
| 6,191,386 B1 | 2/2001 | Albright et al. | |
| 6,467,354 B1 | 10/2002 | Allen | |
| 6,825,441 B2 * | 11/2004 | Katooka | B23K 9/10 |
| | | | 219/130.1 |
| 7,645,960 B2 | 1/2010 | Stava | |
| 7,781,700 B2 | 8/2010 | Harris | |
| 8,383,986 B2 * | 2/2013 | Uezono | B23K 9/0671 |
| | | | 219/130.01 |
| 2004/0020907 A1 * | 2/2004 | Zauner | B23K 9/0953 |
| | | | 219/130.21 |
| 2005/0279819 A1 * | 12/2005 | Stava | B23K 9/1062 |
| | | | 235/375 |
| 2007/0051711 A1 * | 3/2007 | Kachline | B23K 9/1056 |
| | | | 219/130.01 |
| 2007/0056944 A1 * | 3/2007 | Artelsmair | B23K 9/092 |
| | | | 219/130.5 |
| 2007/0080149 A1 * | 4/2007 | Albrecht | B23K 9/10 |
| | | | 219/130.01 |
| 2007/0251932 A1 * | 11/2007 | Vogel | B23K 9/0672 |
| | | | 219/130.4 |
| 2009/0173726 A1 * | 7/2009 | Davidson | B23K 9/0956 |
| | | | 219/130.01 |
| 2011/0114616 A1 * | 5/2011 | Albrecht | B23K 9/095 |
| | | | 219/137 R |
| 2012/0298643 A1 * | 11/2012 | Lambert | B23K 9/0953 |
| | | | 219/130.21 |

FOREIGN PATENT DOCUMENTS

| | | |
|---|---|---|
| JP | 20033145266 A | 5/2003 |
| JP | 2006159273 A * | 6/2006 |
| WO | 9958285 A2 | 11/1999 |
| WO | 9958286 A1 | 11/1999 |
| WO | 2009097190 A1 | 8/2009 |
| WO | 2010051104 A1 | 5/2010 |
| WO | 2010142858 A1 | 12/2010 |
| WO | 2011112628 A1 | 9/2011 |

OTHER PUBLICATIONS

International Preliminary Report on Patentability and Written Opinion of the International Searching Authority dated Nov. 10, 2016.

* cited by examiner

TIG WELDING SYSTEM

TECHNICAL FIELD

In general, the present invention relates to an improved process for initiating an arc using a tungsten inert gas (TIG) welding system. More particularly, the present invention relates to a TIG welding system which uses electrode color to pre-program an arc initiation sequence for TIG start and to control weld consistency.

BACKGROUND OF THE INVENTION

Welding systems reside at the core of the modern industrial age. From massive automobile assembly operations to automated manufacturing environments, these systems facilitate joining in ever more complicated manufacturing operations. Hot or cold wire welding processes a wire or electrode being heated (e.g., via current) and received by a puddle created by a main heat source (e.g., plasma arc, tungsten inert gas (TIG) welding, metal inert gas (MIG) welding, flux core, laser, among others).

TIG welding may be used in various welding operations including orbital welding and non-orbital welding, manual welding or automated welding operations. TIG welding employs a tungsten electrode. A number of standard electrode sizes are used ranging from 0.020" to 5/32" with the 1/16" and 3/32" being the most commonly used electrode diameters. To establish stable arc, a user will adjust current/voltage amplitude, duration, frequency amperage and in alternating current (AC) welding the ratio of positive to negative pulse to tune the arc based on the electrode being used. A key stage in TIG welding is the initiation of the arc. Tuning the multiple parameters identified above for arc initiation is difficult because of the number of variables available to the user.

SUMMARY OF THE INVENTION

In accordance with an embodiment of the present invention, a TIG welding system is provided including: a power source having a controller in communication therewith, the controller having a memory storing at least one waveform; a welding torch including an electrode electrically connected to the controller; an arc initiation input in communication with the controller, said arc initiation input comprising: an electrode color; and an electrode diameter; wherein in the controller is programmed to select one of the at least one waveform based on the user-selected electrode color and electrode diameter and apply power from the power source to the electrode according to the selected at least one waveform; wherein the at least one waveform includes an arc initiation stage including at least one pulse, wherein during the arc initiation stage, the controller controls at least two of the parameters of an arc starting current, an arc strike time and an arc slope time, and wherein upon attaining a steady state at the combination of electrode color and electrode diameter, the controller is configured to permit user control of the arc current or voltage applied to the electrode.

In one aspect of the invention, the waveform includes a start current greater than two amps and less than the welding amperage to provide early delivery of power to a weld pool, and wherein during the arc initiation stage, the waveform includes a transition from an arc initiation current to the start current to start the sequencing stage, wherein during the sequencing stage, the waveform transitions from the start current to the welding amperage.

The arc initiation stage includes plural pulses, and wherein the transition includes plural pulses, each having a pulse height, wherein the pulse height of each is progressively reduced until reaching the start current. The waveform further includes a positive to negative pulse ratio, preferably wherein the positive to negative pulse ratio is less than 1.

The system has an optional sensor adapted to detect the diameter of the electrode, the sensor being in communication with the controller; and wherein the controller determines whether the electrode diameter and the user-selected electrode color are compatible before applying power to the electrode.

The electrode color input is discrete and associated with at least one of the arc starting current, the arc start time and the arc slope time. The system will include at least one waveform which further includes a sequencing stage, the sequencing stage having a start current, wherein the at least one waveform transitions from the arc initiation stage to the sequencing stage by tapering one or more pulses following the at least one pulse of the arc initiation stage toward the start current, and wherein the start current is not equal to the welding amperage.

The start current input is in communication with the controller, and wherein the start current input establishes the start current for the sequencing stage of the at least one waveform.

During the sequencing stage, the controller transfers control of the arc current or voltage to a user operated controller and within the sequencing stage, the waveform further includes a tail down portion, where control of the arc current or voltage is transferred from the user-operated controller to the controller, and the controller is configured to prevent user control of the arc current or voltage during the tail down portion, and wherein during the tail down portion, the waveform reduces the current to a selected low value in which the selected low value is preferably less than two amps.

A method of controlling a TIG welder is also described comprising: receiving an electrode color in combination with either a detected electrode diameter or an input of the electrode diameter; selecting a waveform from a memory based on the combination, the waveform including an arc initiation stage and a sequencing stage; energizing an electrode according to the waveform; preventing user control of energy to the electrode during the arc initiation stage.

The method includes the parameters of pulse amplitude, pulse duration, restrike number and duration and further may include a pulse taper profile to start current, and a tail out current and post flow.

The method further includes the step of receiving a start current input and, wherein the waveform transitions from an arc initiation stage current to the start current to begin the sequencing stage as well as the step of transitioning includes tapering the pulse amplitude of the arc initiation pulses downward and upward toward the start current.

During the sequencing stage, the waveform ramps from the start current to a welding current, and wherein upon attaining the welding current, the controller permits user control of the energy to the electrode.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
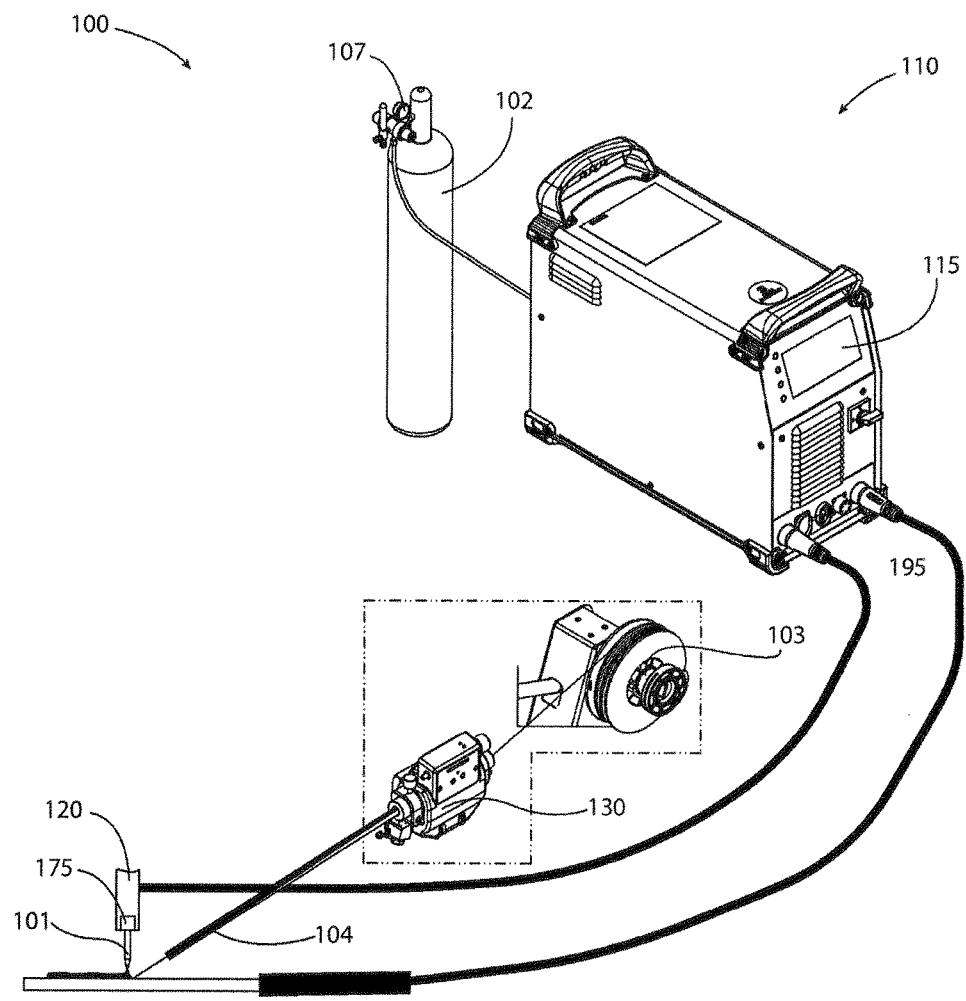
FIG. 1 is a partially schematic perspective view of a welding system according to the invention.

Embodiments of the invention relate to methods and systems that relate to a power source for a welding operation that includes plural pre-programmed waveforms. One of the pre-programmed waveforms is selected based on the color coding associated with a TIG electrode, taken in combination with the diameter of the electrode chosen by the user.

"Welding" or "weld" as used herein including any other formatives of these words will refer to depositing of molten material through the operation of an electric arc including but not limited to submerged arc, GMAW, MAG, MIG, TIG welding, or any electric arc used with an orbital welding system. "Electrode" as used herein describes a conventional electrode, consumable electrode, non-consumable electrode for various arc processes as well as optics to deliver and focus (or defocus) a laser beam light source for the purpose of forming a puddle on a workpiece.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-4 illustrate a welding system that is used with a manual, automated or semi-automated welding system. One illustrative example of a welding system is a Tungsten Inert Gas (TIG) or Gas Tungsten Arc Welding (GTAW) welding.

FIGS. 1-4 illustrate an example of a schematic embodiment of a TIG welding system 100 (also referred to as welder, system, welding system, and/or welder system). Welding system 100 includes a welding power source and a controller. The controller may be made part of power source 110 or be a remote controller such as a pendant or other remote device for operator control. When a remote controller is used, communication between the remote controller and the welder may be made in any known wired or wireless form of communication. In the example shown in FIGS. 1-2, controller 160 is carried within a housing of power source 110 of welder 100. The subject innovation can be used with any welding operation that includes an arc and a hot or cold wire that is liquefied to deposit welding material onto a workpiece.

Controller 160 may be any suitable controller including a programmable logic controller or computer based controller. To provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with processing component.

Controller 160 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within controller 160, such as during start-up, is stored in ROM.

Controller 160 can further include a hard disk drive, a magnetic disk drive, e.g., to read from or write to a removable disk, and an optical disk drive, e.g., for reading a CD-ROM disk or to read from or write to other optical media. Controller 160 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media, which may be referred to simply as memory 165, includes, but is not limited to, RAM, ROM, EEPROM, flash memory or other memory technology, CD-ROM, digital versatile disks (DVD) or other magnetic storage devices, or any other medium which can be used to store the desired information and which can be accessed by controller 160.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in controller 160 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display 115), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition or part of display 115) can be employed with controller 160 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from controller 160 via any wireless or hard wire protocol and/or standard. In another example, controller 160 and/or system can be utilized with a mobile device such as a cellular phone, a smart phone, a tablet, a portable gaming device, a portable Internet browsing device, a Wi-Fi device, a Portable Digital Assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

In an example, a plurality of users can access a local or cloud database (e.g., local database, cloud database, remote database, among others) computing platform (e.g., controller 160) via a web-based application on a computing device, such as a tablet, pad, laptop, cell phone, computer, or other component. The web-based application can allow a user to configure particular reports that quantify data in substantially any format and in comparison to any number of metrics, such as performance benchmarks and the like. Moreover, the software applications can be updated and distributed in a global fashion to insure that each user is using the latest and greatest technology.

With reference to FIG. 1, welding system 100 is a TIG welder having a welding torch, generally indicated at 120 electrically connected to power source 110. Torch 120 is a tungsten-based electrode 101 and consumable wire 105 that are used to deposit weld material to form a weld joint on workpiece W. Electrode 101 has a length suitable for the given welding application, however, any suitable length may be selected. Likewise, the diameter of the electrode is selected from standard size electrodes, which typically range from 0.020" to 5/32" or custom diameters may be selected. The user selects an appropriate size (diameter) electrode for AC or DC welding operations based on the selected amperage. It is understood that selecting an electrode of too great a diameter for a given amperage may cause the arc to rotate around the tip, while too small of a diameter may cause the arc to vaporize/destroy the tungsten electrode. Optionally, electrode diameter may be input by the user or detected by the controller to provide an indication of whether the electrode is suitable for the selected amperage. For example, after the user selects an amperage and prior to arc initiation, controller may provide an indicator to the user that the electrode is or is not suitable for the selected amperage. The indicator may be any audible, visual, or tactile cue, or a combination thereof. For example, an indicator LED may be green when the electrode is appropriately sized for the selected amperage or red if it is not a suitable size.

Welding torch 120 is connected to shield gas supply 102, that provides an inert gas, such as Argon gas, to welding torch 120. As illustrated, welding gas supply 102 is a container, such as a cylinder, that stores shield gas S under pressure, and delivery of shield gas S, is effected via appropriate tubing or other conduits. The welding gas supply is controlled by a regulator or other controller 107. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welder typically includes a wire feeder connected to a supply of welding wire, such as a spool 103 that provides tungsten wire W to one or more wire guides 104. In the example shown, a pair of extended wire guides 104 are provided and fed by spool 103 or other suitable supply of consumable wire.

System 100 includes controller 160 that is configured to control at least two, preferably three welding arc initiation parameters related to system 100 in order to adjust an energizing of welding electrode 101. In general, the at least two welding parameters are adjusted by controller 160 based on input of at least color and electrode diameter from the user. The electrode composition (color) and electrode diameter input component may be any means of providing such information to controller 160 including but not limited to a knob, slider, lever, or other mechanical device for selecting this information within a pre-selected range or series of values, a numerical keypad, +/− selector, or other device for entering specific information or combinations thereof.

Figure 3:
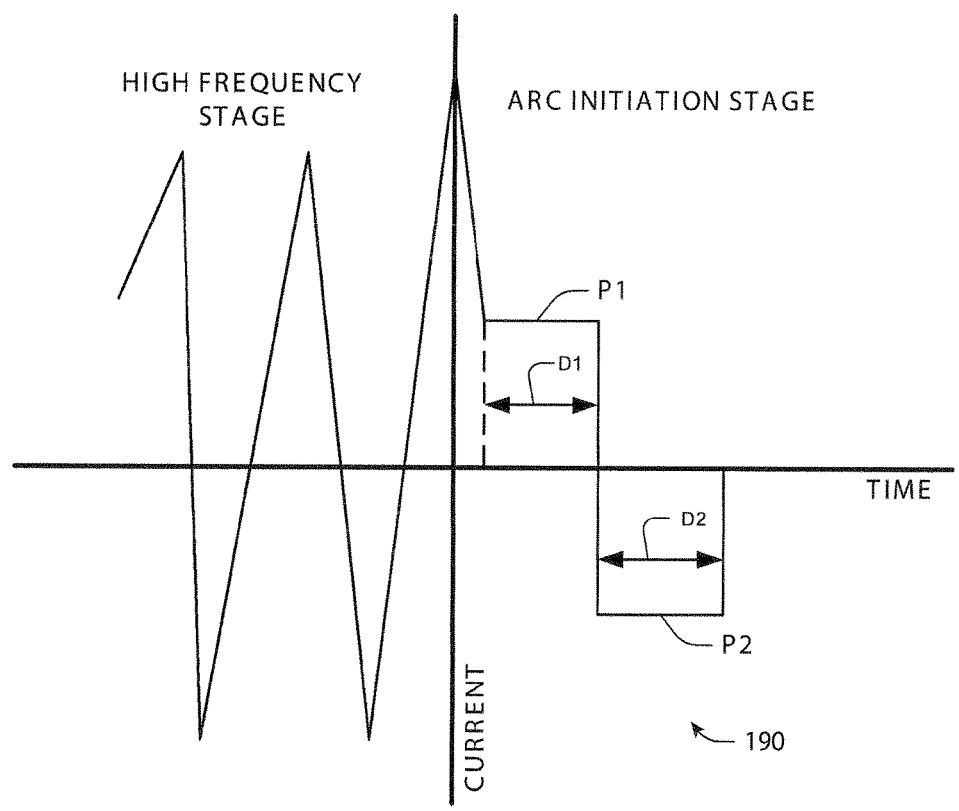
FIG. 3 is a graph depicting one embodiment of a waveform according to the invention during an arc initiation stage.

Additionally, by way of example and not limitation, the welding parameter can further include selection of a waveform based on the selected electrode composition (color) and electrode diameter and energizing of welding electrode 101 based on the selected waveform. As will be understood, the waveform incorporates parameters including pulse height, duration, polarity, frequency and, when using AC current, a ratio between the positive and negative pulses. These parameters may vary depending on the stage of the welding operation. Typical stages include a high frequency pre-arc initiation stage, arc initiation, and sequencing stage. FIG. 3 depicts one example waveform selected for an arc initiation stage. Waveform 190 in this example is for an AC welding operation with a first pulse P1 that is positive and a second pulse P2 that is negative. The pulse duration or pulse width for first pulse is D1 and the duration of second pulse is shown at D2. Waveform 190 provides a pre-set ratio between the positive and negative duration of pulses. This ratio may be a 1 to 1 ratio when the positive and negative pulse duration is equal or an unequal value when either the positive or negative duration value is larger than the other value. In the example shown, the first pulse duration is longer than the second pulse duration resulting in a positive to negative ratio that is greater than 1 to 1. Positive to negative ratios less than 1 can be used as well. The waveform shown is just one example. It will be appreciated that waveforms may be developed by trial and error and programmed into memory 165 of controller 160.

A plurality of waveforms may be stored in memory 165 and correspond to selected color (composition) and diameter values or ranges of amperages defined for a selected waveform such that controller 160 selects a waveform to be communicated to electrode 101. Optionally, electrode diameter may be monitored by diameter sensor 175 in communication with controller 160. Alternatively, the diameter of electrode 101 is input to controller 160 as a user input at 172. In yet another aspect of the invention, the diameter of the welding wire is input to controller 160 and based on this input (or sensed) value, the welding current was set by controller 160.

It is to be appreciated that controller 160 can adjust one or more welding parameters alone or in combination. Additional parameters may be adjusted and/or monitored by controller 160 including but not limited to wire feed speed, any weave or other motion of the torch, puddle temperature and the like. Therefore, the control of parameters discussed should not be considered limiting in terms of the ability of the controller 160 to control other parameters.

It is to be appreciated and understood that system 100 can include various configurations and embodiments and the configuration in system 100 is not to be limiting on the subject innovation. Wire feeder 130 can be a stand-alone component (as depicted), incorporated into welding wire power source 110, controller 160, or other component of system 100 It is to be appreciated that welding wire power source 140 and power source 110 can be separate sources a single power source, or a combination thereof. Controller 160 can be a stand-alone component, incorporated into power source 110, incorporated into torch 120, or component of system 100.

In accordance with an aspect of the invention, controller 160 includes a TIG color-scheme input 170 and electrode diameter input 172 or electrode diameter sensor 175. These inputs may be any digital or analog input including but not limited to a knob, a slider, a toggle, push buttons, numerical keypad, +/− keys, or touch screen that allows the user to directly input a TIG color-scheme and an electrode diameter (or sensed electrode diameter) from a pre-set number of possible selections. Controller 160 includes memory component 165 that stores at least two of the following: one or more waveforms that can be used in the welding process; a strike current, a strike time, and a starting current time.

In the TIG market, popular electrodes with a specific chemical composition are color-coded and well-known to the industry. As shown below, for TIG welding and electrodes, the following non-exhaustive, non-limiting, but illustrative AWS & ISO Classification schemes are employed. The present invention capitalizes on this aspect, i.e., electrode diameter and composition (color or normalized chemical composition) of the tungsten electrodes to drive all of the specific machine settings at different output levels for TIG welding arc initiation.

TABLE I

| AWS Class | AWS Color* | ISO Class | ISO Color | Alloying Element | Alloying Oxide | Alloying oxide |
|---|---|---|---|---|---|---|
| EWP | Green | WP | Green | — | — | — |
| EWCe-2 | Orange | WC20 | Gray | Cerium | $CeO_2$ | ~2% |
| EWLa-1 | Black | WL10 | Black | Lanthanum | $La_2O_3$ | ~1% |
| EWLa-1.5 | Gold | WL15 | Gold | Lanthanum | $La_2O_3$ | ~1.5% |
| EWLa-2 | Blue | WL20 | Sky-Blue | Lanthanum | $La_2O_3$ | ~2% |
| EWTh-1 | Yellow | WT10 | Yellow | Thorium | $ThO_2$ | ~1% |
| EWTH-2 | Red | WT20 | Red | Thorium | $THO_2$ | ~2% |
|  |  | WT30 | Violet | Thorium | $THO_2$ | ~3% |
|  |  | WT40 | Orange | Thorium | $THO_2$ | ~4% |
| EWZr-1 | Brown | WZ3 | Brown | Zirconium | $ZrO_2$ | ~0.25% |
|  |  | WZ8 | White | Zirconium | $ZrO_2$ | ~0.8% |
|  |  | WY20 | Blue | Yttrium | $Y_2O_3$ | ~2% |
|  |  | WR2 | Turquoise |  | blended oxide |  |

*Color may applied in the form of bands, dots, etc., at any point on the surface of the electrode Typically for TIG welding, the power source initially undergoes a high frequency stage that leads to an arc initiation stage using the combination of parameters illustrated in Table II. For TIG welding, the starting procedure is critical. Ideally, the arc should ignite and get established quickly without any tungsten contamination. The prior art typically attempted to use a relatively generic set of parameters for the arc initiation process as illustrated below.

TABLE II

| Diameter (mm) | 0.5 | 1.0 | 1.6 | 2.4 | 3.2 | 4.0 |
|---|---|---|---|---|---|---|
| Start current (amps) | | | | | | |
| All types | 15 | 20 | 75 | 120 | 150 | 175 |
| Strike time (ms) | | | | | | |
| All types | 20 | 20 | 30 | 30 | 40 | 40 |
| PCRT (A) | | | | | | |
| All types | 2 | 3 | 5 | 10 | 20 | 20 |

Precision in TIG initiation has only been accomplished by precisely dialing in the starting parameters including starting amperages, duration, duty cycles, and wave forms which lead into the welding current and relevant parameters based on the combination of the size and composition of the electrodes which were input by the users. However, this led to a myriad of parameters which the user was often unable to determine which to employ. Available equipment in the market today, do not have automatically tuned or synergic starting settings in accordance with the size and color (composition) of the electrodes. And there is no relationship between the type of tungsten and the start parameters as illustrated in Table II above. Only by bringing the parameters, i.e., color (composition) and electrode diameter, in a synergic curve, will the welder get premium starting without tungsten contamination. Such a feature is user-friendly, and in the event that any specific user wishes to alter and/or save unique starting parameters, it is possible to do so.

As better illustrated in Table III below, in an illustrative exemplary manner, the starting arc initiation current which is desirable to achieve minimal TIG welding contamination during start-up, is not uniform across electrode composition or electrode diameter. While this starting amperage is factored using electrode diameter in the prior art method of Table II, there is no factoring of electrode composition, which as illustrated in Table III, plays a large role in the user achieving minimal tungsten contamination in the weld during arc initiation.

TABLE III

| | | Diameter (mm) | | | | | |
|---|---|---|---|---|---|---|---|
| | | 0.5 | 1.0 | 1.6 | 2.4 | 3.2 | 4.0 |
| ISO Class | ISO color | Starting current (amps) | | | | | |
| WC20 | gray | | 40 | 75 | 120 | 150 | |
| WL15 | gold | | | | 120 | 150 | 150 |
| WP | green | 15 | 40 | 75 | 130 | 150 | 175 |
| WT20 | red | 15 | | 75 | 120 | 150 | |
| WZr8 | white | | 40 | 75 | 120 | 150 | 140 |
| WR2 | turquoise | | 40 | 75 | 120 | 150 | 150 |

Equally missing from Table II, but illustrated below in Table IV, is the relationship between electrode strike time (measured in milliseconds) as related to electrode composition and diameter. While electrode diameter had been factored into the arc initiation conditions, electrode composition was missing. As used herein, strike time is the pulse width of the start current including both the positive and negative cycle.

TABLE IV

| | | Diameter (mm) | | | | | |
|---|---|---|---|---|---|---|---|
| | | 0.5 | 1.0 | 1.6 | 2.4 | 3.2 | 4.0 |
| ISO Class | ISO color | Strike time (ms) | | | | | |
| WC20 | gray | | 30 | 20 | 30 | 30 | |
| WL15 | gold | | | | 40 | 30 | 45 |
| WP | green | 20 | 30 | 40 | 70 | 70 | 90 |
| WT20 | red | 20 | | 30 | 30 | 50 | |
| WZr8 | white | | 30 | 20 | 30 | 30 | 40 |
| WR2 | turquoise | | 30 | 20 | 40 | 50 | 40 |

Equally missing from Table II, but illustrated below in Table V, is the relationship between electrode slope time (measured in milliseconds) as related to electrode composition and diameter. While electrode diameter had been factored into the arc initiation conditions, electrode composition was missing. As used herein, slope time is the time it takes to ramp from the start current to the welding current.

TABLE V

| | | Diameter (mm) | | | | | |
|---|---|---|---|---|---|---|---|
| | | 0.5 | 1.0 | 1.6 | 2.4 | 3.2 | 4.0 |
| ISO Class | ISO color | Slope time (ms) | | | | | |
| WC20 | gray | | 40 | 30 | 30 | 40 | |
| WL15 | gold | | | | 30 | 40 | 30 |

TABLE V-continued

| | | Diameter (mm) | | | | | |
|---|---|---|---|---|---|---|---|
| ISO Class | ISO color | 0.5 | 1.0 | 1.6 | 2.4 | 3.2 | 4.0 |
| | | Slope time (ms) | | | | | |
| WP | green | 20 | 40 | 50 | 50 | 50 | 40 |
| WT20 | red | 20 | | 30 | 30 | 40 | |
| WZr8 | white | | 30 | 30 | 20 | 40 | 30 |
| WR2 | turquoise | | 30 | 30 | 30 | 40 | 30 |

As used herein, PCRT is the allowable minimum current for users to dial in measured in amps.

TABLE VI

| | Diameter (mm) | | | | | |
|---|---|---|---|---|---|---|
| | 0.5 | 1.0 | 1.6 | 2.4 | 3.2 | 4.0 |
| | PRCT (A) | | | | | |
| all types | 2 | 3 | 7 | 10 | 15 | 20 |

Focusing on the arc initiation stage, based on the user selected electrode color and electrode diameter (input or detected), specific parameters for starting current, strike time and slope time are employed by the power inverter. In addition, an arc initiation waveform is determined. The waveform includes but is not limited to the current/voltage pulse amplitude, pulse duration, pulse frequency, pulse polarity and positive negative pulse ratio (for AC welding), and how it transitions into the starting current (SC) which is the start of the sequencing stage. Since these parameters are pre-programmed or extrapolated for a given electrode color and electrode diameter, the user does not have to fine tune these parameters to conduct the welding operation. In accordance with one aspect of the invention, the controller is typically configured to prevent user input of other arc initiation parameters, so that control of the arc initiation phase is exclusive to the controller. This greatly simplifies the set up and arc initiation process for the user allowing the user to focus on conducting the welding operation.

Figure 2:
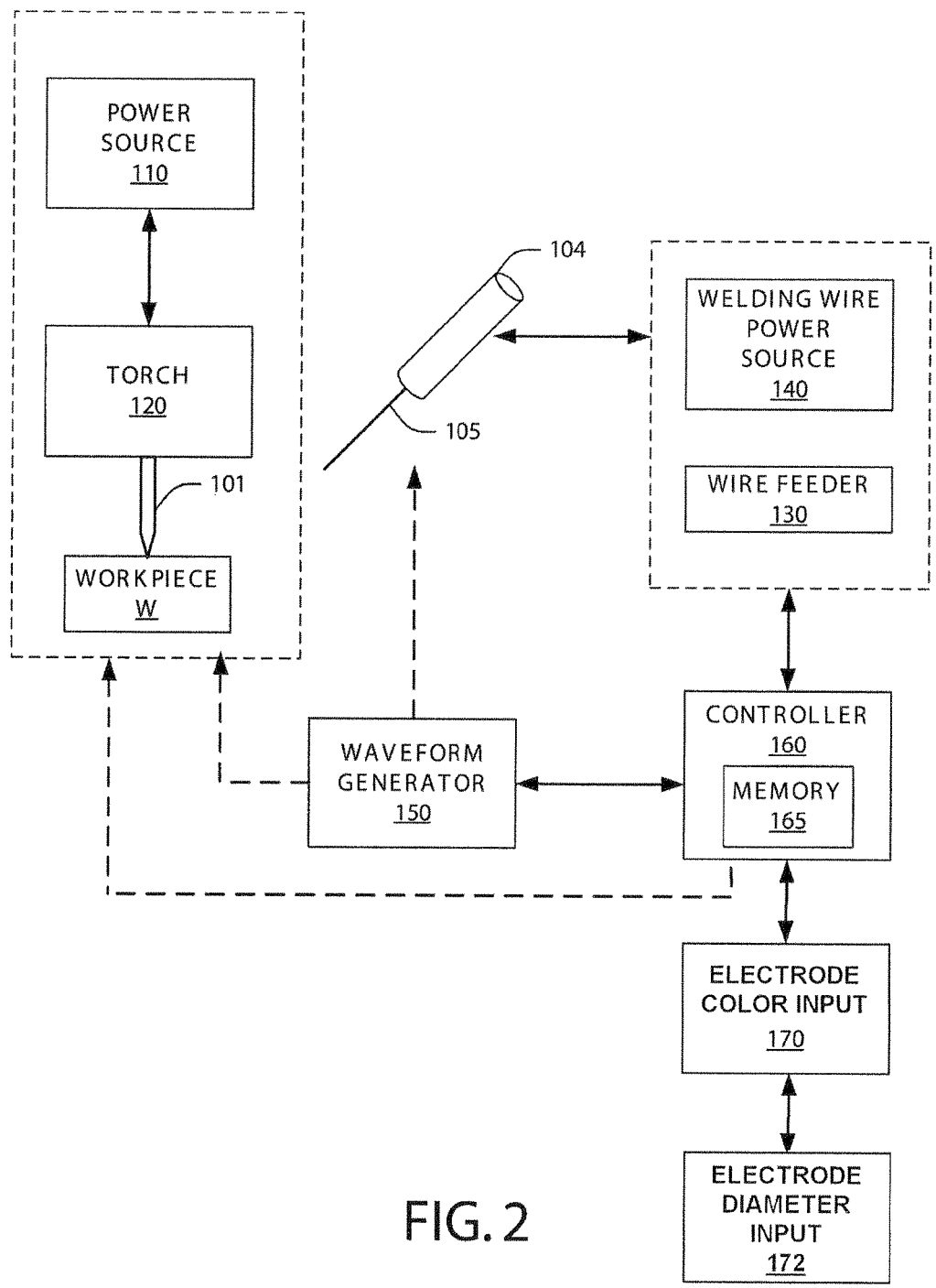
FIG. 2 is a schematic view of a welding system according to one embodiment of the invention.
Figure 4:
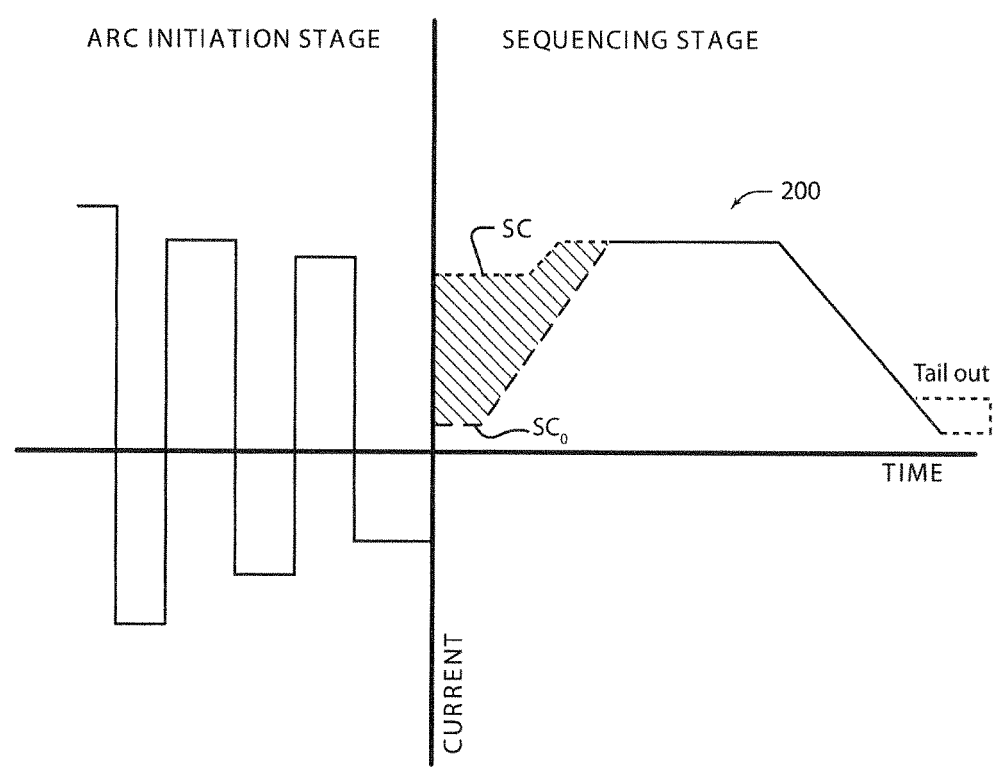
FIG. 4 is a graph depicting one embodiment of a waveform according to the invention during an arc initiation stage.

As illustrated in FIG. 2, the user inputs an electrode color 170 and electrode diameter 172 (or sensed electrode diameter 175) to start the current for the welding operation through controller 160. Through the combination above, the appropriate starting current, strike time and slope time are applied by the controller to the set the arc initiation sequence prior to the sequencing stage of the welding operation as better shown in FIG. 4. Preceding the sequencing stage, the power to the electrode is typically ramped down to a very low level i.e. less than 2 amps, before the sequencing stage begins. The dashed line in FIG. 4 represents an existing sequencing stage, where the sequencing stage includes a very small start current SCE (near 0). The sequencing stage in this case is symmetrical with the waveform ramping up from low to start current to the steady state current SSC and then ramping down to a tail out (for terminating) current.

The combination color/diameter combination will define pertinent arc initiation parameters. The waveform line transitions from an arc initiation stage ramping up or down to the desired start current SC. In the example shown, current pulses in the arc initiation stage that are ramped down with progressively smaller pulse heights until reaching the desired start current. Once the desired start current SC is achieved, waveform 200 transitions to a sequencing stage. As shown, sequencing stage starts from the start current SC and ramps up to a steady state current until termination, which includes a ramp down to near 0 current. The dashed line existing waveform ramps up from user dialed low start current SCE resulting in a longer cycle time to deliver the energy/power to the weld pool than the sequencing stage of the current inventions. In the example shown, the difference in energy/power delivered between an existing system with a start current SCE and the start current SC of the invention is shown at the shaded area. As indicated in the dashed line example, a symmetrical waveform is required in existing applications such that if a higher starting current were used, the tail down would be back to the starting current value. FIG. 4 illustrates a ramp down that is controlled independent of the start current SC, allowing the tail down to levels other than that of the start current. For example, as shown, tail out may occur at a level less than the start current level including but not limited to a near zero level as shown. The tail out down to the near zero amps is used in the example to minimize crater and to prevent cracks occurring in the weld.

In the arc initiation stage, controller 160 takes the wire color 170 and wire diameter 172 parameters and uses them to initiate a TIG arc. Once the starting state is elapsed the user will have full control of the remote potentiometer, for example in a foot pedal, to control the current during welding. As shown in FIG. 4, superimposed waveform 200 may include a pre-flow period where the arc is maintained while the flow of shield gas from gas source 102 is started. After the pre-flow period, the arc may ramp up to a welding current and control is transitioned from system controller 160 to user operated control 195, such as a foot pedal, remote potentiometer, or a knob, as shown in FIG. 1. After the welding process is complete, the system controller 160 may resume control by transferring control of the arc current away from the user operated control 195 to the waveform 200 selected by controller 160. At this point, the waveform includes a tail out or ending current where the current is ramped down toward a selected low value. The low value may be a value near zero independently selected by the users or other value selected according to the quality performance of the machines offers. Controller 160 may then execute a post-flow stage where shielding gas continues to flow for a period that reduces the likelihood of weld contamination by maintaining the shield gas flow until the weld cures. A minimum tail out current will be separate from the set start current. The minimum current for the tail out can be as low as the welding machine allows.

By presetting the TIG arc initiation according to a welding electrode color and diameter, the arc initiation process will first go through the starting sequence with reasonable preset current to prevent novice users from having difficulty to stabilize the arc.

Figure 5:
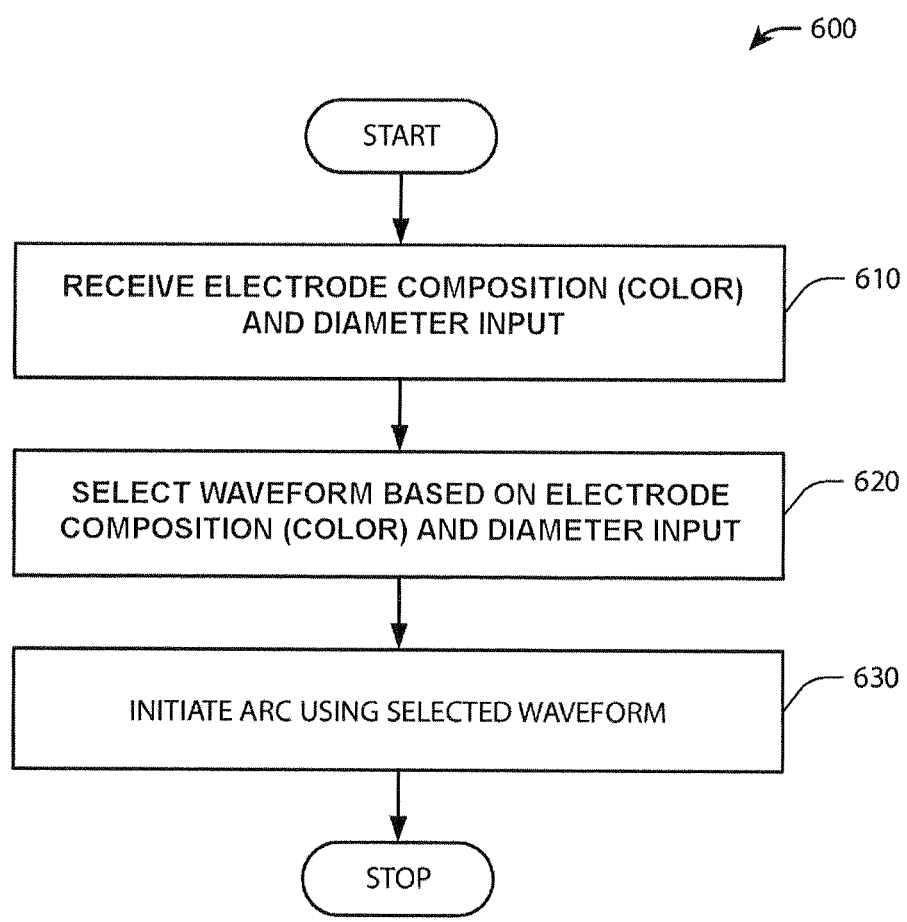
FIG. 5 is a flow diagram of selecting a waveform for arc initiation based on an input amperage.
Figure 6:
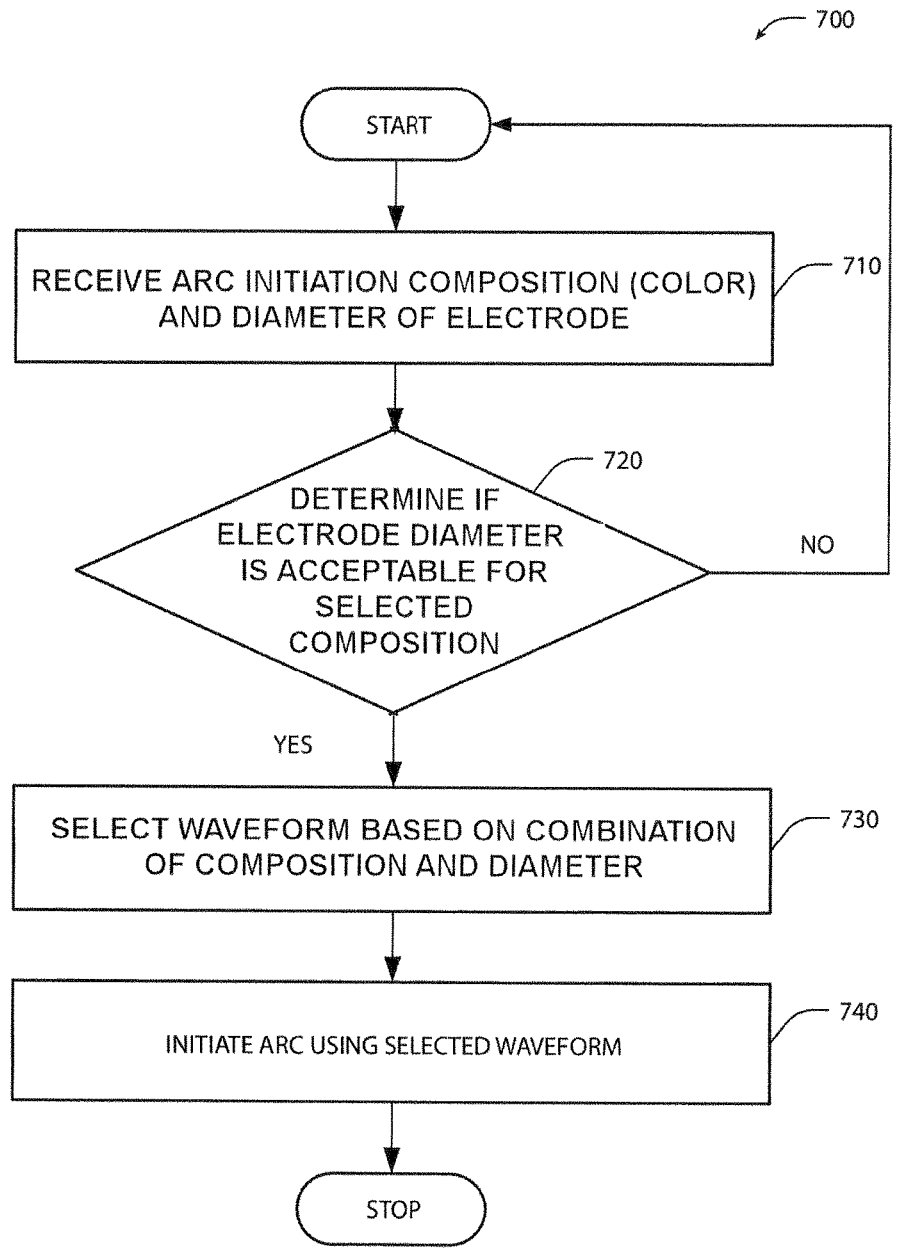
FIG. 6 is a flow diagram of selecting a waveform for arc initiation based on an input amperage after determining whether the electrode and input amperage are suitable for arc initiation.

In view of the exemplary devices and elements described supra, methodologies that may be implemented in accordance with the disclosed subject matter will be better appreciated with reference to the flow charts and/or methodology of FIGS. 5-7. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 600 of FIG. 5 which is a flow diagram 600 that provides control of an energizing of a welding electrode based on a composition (color) and an electrode diameter input by the user for arc initiation.

Accordingly, an electrode color input 170 and an electrode diameter input 172 for arc initiation is received from user at 610 via inputs to controller 160. Controller 160 selects at least one waveform from a plurality of waveforms stored in memory 165 at 620, and initiates the arc at electrode 101 using the selected waveform 630. Optionally, as discussed above, a check may be put in place to determine whether the electrode diameter and electrode color composition input are compatible. As shown in FIG. 6, after receiving the electrode composition (color) and electrode diameter input at 710, based on feedback from an electrode diameter sensor 175 or input from the user, controller 160 determines whether the electrode diameter and electrode composition are suitable for each other. If not, an indicator is issued at 725 to alert the user that the electrode diameter and composition are not suitably matched allowing the user to reselect a different parameter or electrode. If the electrode composition and diameter are suitable, controller 160 selects at least one waveform from a plurality of waveforms stored in memory 165 based on the input combination at 730, and initiates the arc with the selected waveform at 740.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A TIG welding system comprising:
   a power source having a controller in communication therewith, the controller having a memory storing at least one waveform; and
   a welding torch including a non-consumable electrode electrically connected to the controller,
   wherein the controller is configured to receive an arc initiation input comprising:
   an electrode color, and
   an electrode diameter,
   wherein the controller is programmed to choose a selected waveform from the at least one waveform based on the arc initiation input and apply power from the power source to the non-consumable electrode according to the selected waveform,
   wherein the selected waveform includes an arc initiation stage and a sequencing stage, wherein during the arc initiation stage, the controller prevents user control of energy to the non-consumable electrode, and controls at least two parameters of an arc initiation current, an arc strike time, and an arc slope time, and wherein upon attaining a steady state, the controller transfers control of an arc current or voltage to a user,
   wherein during the arc initiation stage, the selected waveform includes a transition from the arc initiation current to a start current of the sequencing stage, wherein during the sequencing stage, the selected waveform transitions from the start current to a welding amperage, and
   wherein the arc initiation stage includes plural pulses, and wherein the transition includes plural pulses, each having a pulse height, wherein the pulse height of each is progressively reduced until reaching the start current.

2. The TIG welding system of claim 1, wherein the selected waveform includes the start current being greater than 2 amps and less than the welding amperage to provide early delivery of power to a weld pool.

3. The TIG welding system of claim 2, wherein the controller transfers control of the arc current or voltage to the user during the sequencing stage.

4. The TIG welding system of claim 3 wherein within the sequencing stage, the selected waveform further includes a tail down portion, where control of the arc current or voltage is transferred from the user to the controller, and
   the controller is configured to prevent user control of the arc current or voltage during the tail down portion, and wherein during the tail down portion, the selected waveform reduces the arc current to a selected low value.

5. The TIG welding system of claim 4, wherein the selected low value is less than two amps.

6. The TIG welding system of claim 1, wherein the selected waveform includes a pulse height parameter, and a pulse duration parameter.

7. The TIG welding system of claim 6, wherein the selected waveform further includes a positive to negative pulse ratio.

8. The TIG welding system of claim 7, wherein the positive to negative pulse ratio is less than 1.

9. The TIG welding system of claim 1 further comprising a sensor adapted to detect the electrode diameter, the sensor being in communication with the controller;

wherein the controller determines whether the electrode diameter and the electrode color are compatible before applying power to the electrode.

10. The TIG welding system of claim 1, wherein the electrode color input is discrete and associated with at least one of the arc initiation current, the arc strike time and the arc slope time.

11. The TIG welding system of claim 1, wherein the start current is not equal to the welding amperage.

12. The TIG welding system of claim 11 wherein:
the controller is further configured to receive a start current input, wherein the start current input establishes the start current for the sequencing stage of the selected waveform.

* * * * *